UNITED STATES PATENT OFFICE.

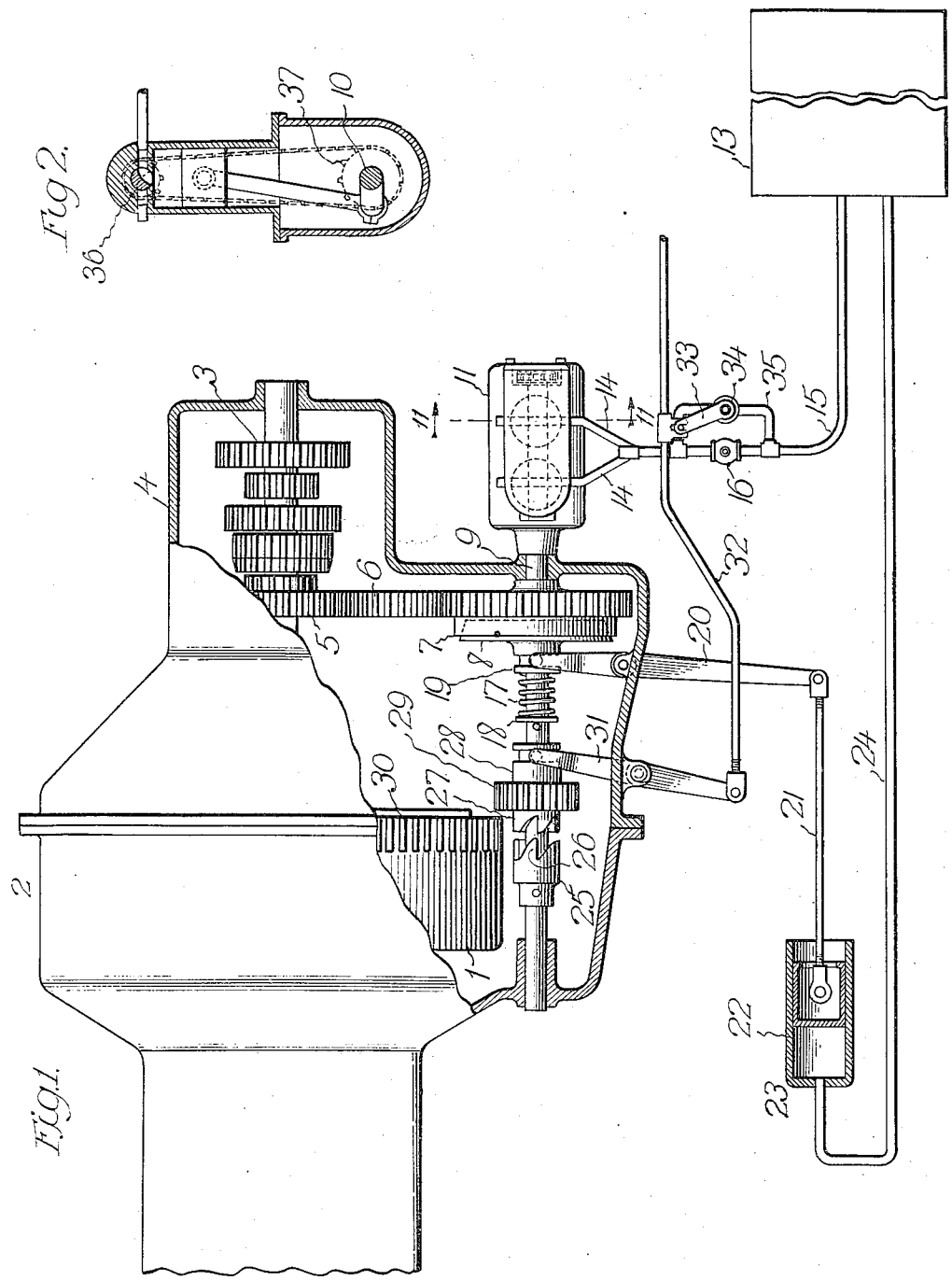

WALTER L. MARR, OF FLINT, MICHIGAN.

STARTING DEVICE FOR EXPLOSIVE-ENGINES.

1,104,058.  Specification of Letters Patent.  Patented July 21, 1914.

Application filed June 21, 1913. Serial No. 775,035.

*To all whom it may concern:*

Be it known that I, WALTER L. MARR, a citizen of the United States of America, residing at Flint, in the county of Genesee and State of Michigan, have invented certain new and useful Improvements in Starting Devices for Explosive-Engines, of which the following is a specification, reference being had therein to the accompanying drawings.

This invention relates to a starting device for explosive engines of the type wherein the motor is rotated until it has "picked up" in such manner as to run, and includes means for automatically maintaining itself in operative condition.

The invention consists in the matters hereinafter set forth and more particularly pointed out in the appended claims.

In the drawings, Figure 1 is a plan view, partially broken away and in section, showing a device that embodies features of the invention; Fig. 2 is a view on line 11—11 of Fig. 1, showing a detail of a compressor mechanism.

Referring to the drawings a motor of any preferred type has a fly wheel 1 that is housed in a casing 2 and is operatively connected to a change-speed mechanism of any preferred type indicated at 3 that may be conveniently mounted in a gear casing 4.

A member 5 of the change-speed mechanism that is always operated by the motor, is connected through a reduction train indicated at 6 with one member 7 of a clutch. The latter is of the friction type preferably and the companion member 8 that may be shifted in and out of engagement with the member 7, is non-rotatable and longitudinally reciprocable on a countershaft 9. An extension of the shaft 9 constitutes the crank shaft (seen at 10 Fig. 2) of an air compressor 11 that may also be operated as an air motor, depending upon the disposition of its valves. A pressure tank 13 is connected with the cylinders of the compressor through branch pipes 14 which unite in a feed pipe 15. A check valve 16 in the pipe line 15 prevents return of air from the tank to the compressor. The clutch member 8 is normally thrown into engagement with the member 7 by a spring 17 that encircles the shaft 9 in compression between a stop collar 18 and a grooved hub 19 of said member. This spring operates in opposition to the movement of a lever 20 that is pivoted in the casing 4 and is engaged at one end in the groove of the hub 19 and is articulated at the other end by a link 21 with a piston 22. The latter is reciprocable in a cylinder 23 whose interior is always in communication with the tank 13 through a pressure pipe 24.

By regulation of the tension of the spring 17, the member 8 moves out of engagement whenever the pressure in the tank 13 exceeds that for which the spring is set.

A clutch collar 25 is non-rotatably secured on the shaft 9 in such position that when teeth 26 of ratchet or detent type engage with corresponding teeth 27 on a shifting sleeve 28, slidable on said shaft, a pinion 29 on the latter meshes with gear teeth 30 cut in the fly wheel 1.

The forked end of a lever 31 that is pivoted in the casing 4, engages a peripheral groove in the sleeve 28 at one end and at the other is coupled by a push rod 32 with a valve arm 33. The latter controls a valve 34 which is placed in a by-pass 35 around the check valve 16. The teeth 26 and 27 of the clutch collar and slide sleeve are so disposed that when the pinion 29 tends to drive the fly wheel 30 the parts stay in engagement, but when the fly wheel teeth tend to move more rapidly than the pinion 29, as the motor picks up, the teeth 26 and 27 cam apart, leaving the connections and valve 34 as indicated in Fig. 1, that is in shut-off position.

As a matter of detail, the compressor 11 may have a rotary valve as indicated at 36, driven from the crank shaft 10 by sprocket and chain connections indicated at 37 or by other positive means whereby the valve is held in timed relation to the crank shaft.

It is to be understood that the valve is so disposed that the compressor, when driven, forces air into the tank through the check valve and that when the by-pass valve is open, the compressed air in the tank tends to operate the compressor as a motor.

In operation, movement of the push rod so as to throw the pinion of the countershaft into interlocked relation therewith and in mesh with the fly wheel of the motor, and at the same time open the by-pass valve, causes the compressor to operate as a motor and turn the fly wheel until the engine has picked up and thereby thrown out the pinion through the cam action of its clutch parts. If this has caused the pressure of the tank to fall below the predetermined point, the friction clutch is thrown in by the resultant action of the spring so that the compressor is driven from the change-speed train of the engine until the predetermined pressure in the tank is reëstablished when the spring is overpowered by the pressure in the air cylinder.

The device is adaptable for use with motors of different type and with change speed mechanism in various forms, is positive in action and does not add greatly to the weight of an automobile or motor boat to which it may be applied. It affords a positive rotary movement to the engine and does not require any change in the ignition or priming system of the latter.

Obviously, changes in the details of construction may be made without departing from the spirit of my invention and I do not care to limit myself to any particular form or arrangement of parts.

I claim as my invention:—

1. The combination of an engine, a fly wheel therefor, and a change speed mechanism one of whose members always moves with the engine, with an air pressure tank, a combined compressor and motor whose cylinders are in communication with the tank, means controlled by the compressed air in the tank and adapted to operatively connect the compressor with the change speed mechanism for forcing air into the tank, manually operable means for connecting the compressor to rotate the fly wheel and to admit air to the compressor as a motor from the tank, adapted to automatically release the fly wheel from the compressor when the speed of the fly wheel exceeds the speed of the compressor.

2. The combination of an explosive engine, a fly wheel therefor, and change speed mechanism driven thereby, with a compressed air tank, a compressor motor whose cylinders are in communication with the tank, means automatically preventing return of air from the tank to the compressor, manually operable means adapted to operatively connect the fly wheel and the compressor and to simultaneously open communication from the tank to the compressor cylinders, adapted to automatically release the compressor and close such communication when the fly wheel speed exceeds the compressor speed, and means controlled by the pressure of air in the tank and adapted to automatically connect the compressor with the change speed mechanism when the pressure in the tank falls below a predetermined point.

3. The combination of an explosive engine, a fly wheel therefor and change speed mechanism operated thereby, with an air compressor and motor, a countershaft turning with the compressor, a pressure tank in communication with the compressor through a check valve, clutch mechanism adapted to positively connect the compressor and fly wheel and adapted to automatically release the compressor when the fly wheel exceeds the speed thereof, means for operating the clutch adapted to simultaneously open communication between the compressor and the air tank and a clutch for coupling the compressor to the change-speed mechanism adapted to automatically release the compressor when the pressure in the tank exceeds a predetermined point.

4. The combination of an explosive engine, fly wheel and change-speed mechanism driven therefrom, with a countershaft, a combined air compressor and motor coupled to the countershaft, a pressure tank in communication with the compressor through a check valve, a clutch adapted to throw the countershaft into operative connection with the fly wheel when shifted in one direction and to be thrown out in the opposite direction automatically when the speed of the fly wheel exceeds the speed of the clutch mechanism, means for throwing the clutch in, adapted to simultaneously open communication between the compressor and the air tank to operate the former as a motor, a friction clutch adapted to operatively connect the countershaft with the change-speed mechanism, a spring adapted to normally move the friction clutch into engagement and means controlled by the pressure of air in the tank and adapted to open the clutch against the action of the spring when the pressure in the tank reaches a predetermined point.

5. The combination of an engine flywheel having peripheral gear teeth, a change speed mechanism driven thereby, with a countershaft, a combined compressor and motor coupled to the countershaft, a compressed air tank, a pipe line connecting the compressor with the tank, a check valve in the pipe line preventing the return of air from the tank to the compressor, a by-pass around the check valve, a manually operable valve controlling the by-pass, a pinion rotatable and longitudinally movable on the countershaft adapted to mesh with the gear teeth on the fly wheel, clutch members adapted to couple the pinion with the countershaft when it is in mesh with the fly wheel and to throw the pinion out of mesh with the fly wheel when the speed of the latter exceeds the pinion speed, manually operable means adapted to simultaneously throw the pinion into gear and to open the by-pass valve, a friction clutch on the countershaft, one of whose members is connected through speed reduction mechanism with a change-speed train member, a spring adapted to normally throw the friction clutch into engagement to drive the countershaft from the change-speed mechanism, a pressure cylinder constantly in communication with the pressure tank and a piston in the cylinder operatively connected to the friction clutch and adapted to open the latter in opposition to the spring when the pressure in the tank reaches a predetermined point.

6. The combination of an engine, a fly wheel therefor, and a change speed mechanism connected to the engine, a compressed air receptacle, a combined compressor and motor in communication with the receptacle, means controlled by the pressure of the contents of the receptacle and adapted to operatively connect the compressor with the change speed mechanism to force air into the receptacle, manually operable means for connecting the compressor to turn the fly wheel and to admit air to the compressor as a motor from the tank, said means being adapted to automatically disconnect the fly wheel from the compressor when the speed of the latter falls below the speed of the fly wheel.

In testimony whereof I affix my signature in presence of two witnesses.

WALTER L. MARR.

Witnesses:
  MILTON POLLOCK,
  W. L. NELSON.